Aug. 30, 1927. A. DEWANDRE Re. 16,723
MOTOR BRAKE
Original Filed Jan. 12. 1924
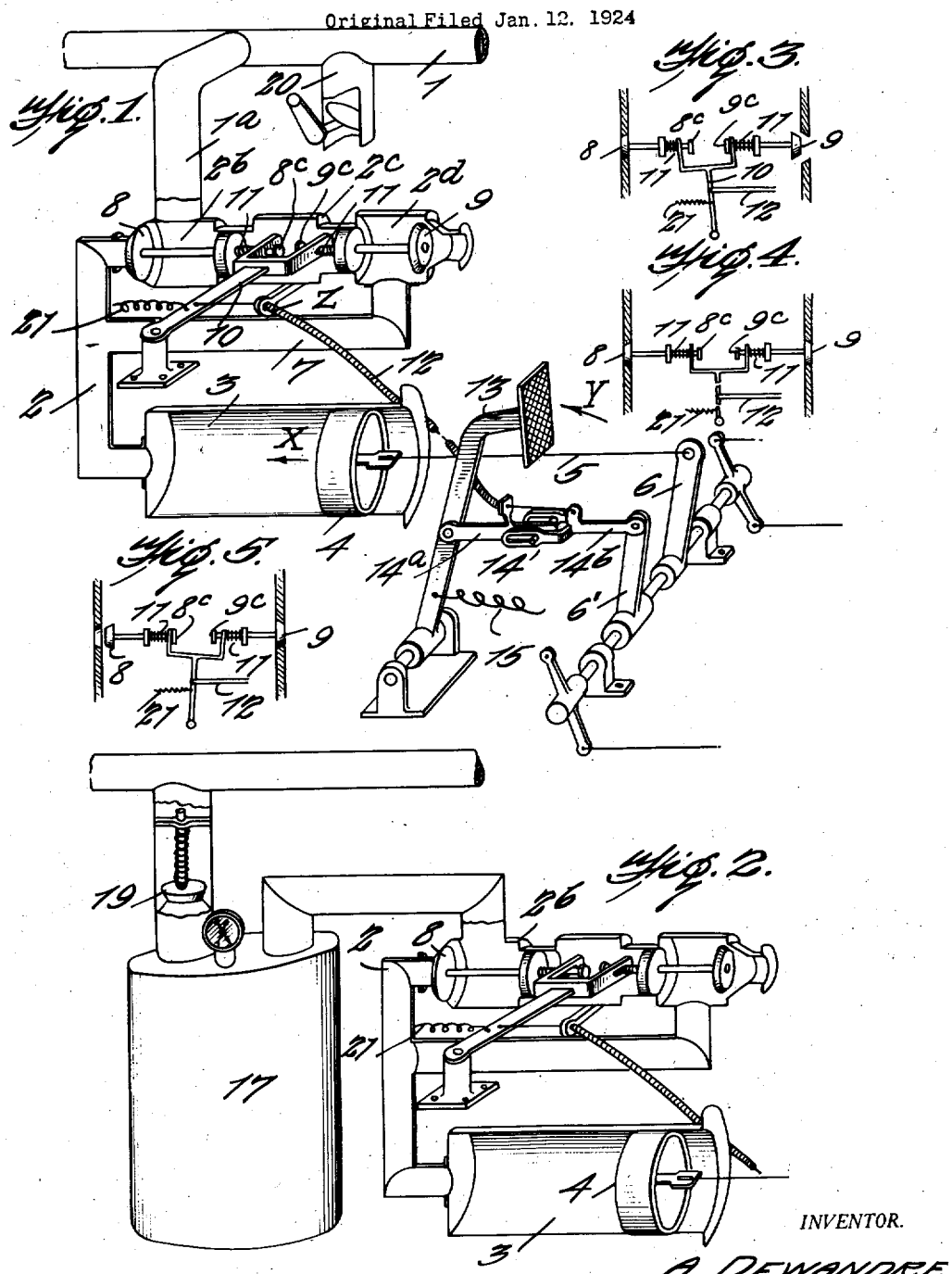
INVENTOR.
A. DEWANDRE,
BY
Jno Quinn
ATTORNEY.

Reissued Aug. 30, 1927. Re. 16,723

UNITED STATES PATENT OFFICE.

ALBERT DEWANDRE, OF LIEGE, BELGIUM, ASSIGNOR TO SOCIETE ANONYME SERVO-FREIN DEWANDRE, OF LIEGE, BELGIUM.

MOTOR BRAKE.

Original No. 1,539,166, dated May 26, 1925, Serial No. 685,814, filed January 12, 1924. Application for reissue filed May 17, 1927. Serial No. 192,125.

The present invention relates to an improved suction brake for vehicles equipped with internal combustion engines, in which the braking action is produced by the partial vacuum created by the suction of the engine. The partial vacuum acts on a piston working in a cylinder which can be placed in communication with either the atmosphere, or with the suction pipe of the engine.

The object of the invention is to provide a brake of the character specified comprising a minimum number of parts whose operation is certain; the arrangement being such as to reduce to a minimum the amount of air exhausted by the engine for the braking requirements.

According to the invention, the valves for controlling the communication of the brake cylinder with the partial vacuum and with the atmosphere, are regulated by a member whose position depends upon the distance between the two parts of a lost-motion connection, located between the brake pedal or other brake-controlling element, and the rodding connected with the brakes.

This member operates the valves in such manner that the one which controls the communication of the cylinder with the atmosphere is closed before the one which controls communication with the suction pipe of the engine opens and vice versa.

The movements of the valve-controlling member can be effected by means of a flexible shaft or cable of the Bowden type the wire and sheath of which are connected at one end to the member in question and to a fixed part of the apparatus respectively, and at the other end to the two parts of the above-mentioned lost-motion connection.

Two constructional forms of the invention are illustrated by way of examples in the accompanying drawings, in which:

Figure 1 illustrates diagrammatically one form of the improved motor brake.

Figure 2 illustrates diagrammatically a second form thereof.

Figure 3 is a diagrammatic view showing the relative positions of the valves when the brakes are off, that is in normal position.

Figure 4 is a similar view showing the relative positions of the valves in the initial operation tending to apply the brakes.

Figure 5 is a similar view showing the relative positions of the valves when the brakes are being applied.

1 indicates the manifold of an internal combustion engine (not shown) and 20, a pipe leading from a carbureter.

A pipe $1^a$ leads from the manifold to a chamber $2^b$ formed in a valve casing $2^c$, one end of the chamber $2^b$, being connected by a pipe 2 to a cylinder 3 in which operates a piston 4, the outer end of which is connected by a rod or cable 5 to a lever arm 6 comprised in the brake rodding.

A pipe 7 opening into the atmosphere through a chamber $2^d$ of the valve casing $2^c$, branches off the pipe 2.

In the illustrated constructional form the valve casing $2^c$ forms a distributor including two valves 8 and 9 arranged respectively in the chambers $2^b$ and $2^d$, beyond pipes 2 and 7, to provide for placing the cylinder 3 under the partial vacuum generated in the engine suction pipe 1, by the working of the engine of the vehicle, or in communication with the atmosphere.

If communication with the atmosphere be cut off by closing the valve 9, and if the valve 8 be then opened, as shown in Figure 5, the partial vacuum produced by the suction of the engine in the pipe 1 will be transmitted to the brake cylinder 3.

The partial vacuum will draw the piston 3 towards the end of the cylinder in the direction of the arrow X, carrying along with it the cable or rod 5 that is connected to the brake rodding in such a manner as to thereby produce the braking operation. If at this moment the valve 8 be returned to its closed position, as shown in Figure 4, the piston 3, theoretically will remain in the position it is then occupying, until communication with the atmosphere has been re-established, so as to allow the piston 4 to move back into its initial position, oppositely to the arrow X, by the action of return springs (not shown) provided at any point of the brake installation.

For the purpose of co-ordinating the movements of the piston in the brake cylinder with the degree of braking force desired by the operator, the distributor consisting of the two valves 8, 9 is controlled from the brake pedal 13 by means of a fork 10 connected to the pedal by a member 12 here shown as a Bowden shaft. The two prongs of the fork act directly against stops $8^c$ and $9^c$, provided on the ends of the tail pieces of the valves 8, 9 respectively, for opening such valves, and act oppositely on the valves through springs 11, to close the valves. That is, spring 11 under pressure from the fork away from a particular stop will transmit the pressure to close the particular valve, while engagement of the prongs with the stops $8^c$ or $9^c$ will open the particular valve. The length of the tail pieces of these valves is such as to ensure that the valves shall act one after the other; that is in a limit movement of the fork, the valve toward which the fork is moving will be closed by the pressure on its spring 11 before the fork engages the stop on the tail piece of the valve from which the fork is moving with an effect to open such valve.

Considering first the position shown in Figures 1 and 3, it will be understood that the valve 9 must be completely closed before the valve 8 begins to open, and vice versa.

It is also to be noted that the brake pedal 13 is connected to a lever arm 6′, included in the brake rodding, and movable simultaneously and similarly with lever arm 6, by a coupling or lost-motion connection 14 comprising two elements $14^a$ and $14^b$ capable of sliding relatively to each other when pressure is applied to the pedal 13 in a direction indicated by the arrow Y.

In this arrangement, pressure exerted upon the pedal 13 against the tension of spring 15, in the direction of the arrow Y, will first relatively move the two movably-related parts $14^a$ and $14^b$ of the lost-motion connection 14, which is located between the said pedal and the lever arm 6 of the brake rodding. The increase of this distance effects, through the intermediary of the Bowden shaft 12, a decrease in the distance between the fork 10 and the fixed point Z on the apparatus frame whereto is attached the end of the flexible sheath member of said shaft. Consequently, the fork is caused to swing in a clockwise direction about its pivot, and as a result of this movement the valve 9, which controls communication between the brake cylinder 3 and the atmosphere, is first of all closed by the fork acting against spring 11 on the tail piece of the valve, as shown in Figure 4, thus tensioning spring 21. Thereafter, if the movement of the pedal is continued, the valve 8 is opened, by the fork engaging the stop $8^c$ on the tail piece of that valve, as shown in Figure 5 and communication is established between the brake cylinder and the suction pipe 1 of the engine. In the operation described, the sheath of the Bowden wire is forced into curved form by the described movement of the pedal, causing the wire in such sheath to move relatively toward the lost-motion connection $14^b$ to which one terminal of the wire is secured. This relative movement of the wire exerts a pull upon the fork 10 in a clockwise direction to provide the action above described. A partial vacuum is thus set up in the cylinder 3 and the brake piston 4 moves in the direction of the arrow X, exerting on the rodding a force which tends to apply the brakes. As the brakes are applied, the lever arm 6 moves to operate the part $14^b$ of the lost motion connection to follow the part $14^a$ of such connection moved initially by the pedal, and if the movement of the pedal is interrupted, that is stopped, the movement of the lost motion connection part $14^b$ decreases the distance between the two parts $14^a$ and $14^b$ of such connection, causing the fork to move in a counter-clockwise direction to an extent necessary to relieve the pull on the stop $8^c$ of valve 8 and exert pressure on the spring 11 of such valve 8, with the effect to close the valve 8. This movement under the described conditions will not, however, be sufficient to open valve 9 the valves being then in the positions shown in Figure 4. Thus in this disposition of the parts the pedal is held in an operated position, both valves are closed and the brakes remain applied. If an increased braking effect is desired, a further depression of the pedal will have the effect described in the initial operation, that is will again increase the distance between the two moving parts $14^a$ and $14^b$ of the lost motion connection, move the fork clockwise, and open valve 8, opening the cylinder 3 to the suction of the engine and applying the brakes with additional pressure, until when the pedal is stopped, the lever arm, through its described movement of its part $14^b$ of the lost motion connection will again close valve 8 to hold the brakes set.

It will be apparent that, in consequence of the above described operation, each position of the pedal will correspond and determine a braking action of predetermined intensity; that is the braking may be limited at any time by simply stopping the operative movement of the pedal, and may be increased at any time and to any extent by a continued and corresponding movement of the pedal.

With the brakes set, if the operator permits the pedal to return toward normal position through reduction of his pressure on the pedal and spring 15, the distance between the parts $14^a$ and $14^b$ of the lost motion connection is decreased, as the part $14^b$ is held by the position of the brakes and the part $14^a$ moves toward part $14^b$ by the pedal movement. The fork 10 moves counter clockwise and the valve 9 is opened, under the action of spring 21 to establish communication between the brake cylinder 3 and the atmosphere, permitting the piston 4 to relieve the pull in the brakes. If the pedal is stopped during this return movement, the parts 14ᵃ and 14ᵇ of the lost motion connection move relatively toward each other, the valve 9 closes, the relief movement of the piston 4 is stopped and the brakes are thus held in whatever set or applied position they may then occupy. This permits the operator to relieve the braking force to any desired extent simply through appropriate movement of the pedal.

If the pedal is permitted to move all the way back to its original or normal position, the release of the brakes will be complete, as the distance between the parts 14ᵃ and 14ᵇ of the lost-motion connection will be at its maximum, the fork will move counter clockwise to the extent to open valve 9, the atmosphere will be admitted to the brake cylinder, and the brakes will be relieved or thrown off by their springs and the piston 4 returned to normal position, the valves then being in normal position as shown in Figure 3.

Moreover, it is to be noted that under any air leakage into cylinder 3 while the brakes are set, the braking action will tend to be reduced through rearward movement of the piston 4. In this action the lever arm of the rodding will move to increase the distance between the two parts 14ᵃ and 14ᵇ of the lost motion connection, and as a result the fork will move in a clockwise direction, opening valve 8 and the engine suction will overcome the air leakage to maintain or restore the brake action.

Assuming the motor means inoperative, as when the engine is not running, an operative movement of the pedal 13 causes the lost motion parts 14ᵃ and 14ᵇ to be moved relatively to their limit, following which further pedal movement will directly apply the brakes, thus providing for a direct manual operation of the brakes.

In order to maintain a certain regularity of the partial vacuum in the cylinder 3, with the object of permitting the piston 4 to be actuated when the engine of the vehicle is stopped, I provide an intermediate reservoir 17 (Fig. 2) interposed between the suction pipe 1, and the pipe 2, leading to the cylinder 3. This intermediate reservoir is fitted according to this invention, with an automatic valve 19.

What I claim is:

1. In a brake system for motors, the combination, with a suction pipe, and rodding for the brakes, of a brake cylinder capable of being placed in communication with the suction pipe or with the atmosphere, a piston working therein, and on which the engine suction acts to effect the braking operation, valves for controlling the communication of the cylinder with said pipe and with the atmosphere, a brake operating element, a lost-motion connection between said operating element and the brake-rodding embodying two movably-related parts and a movable element for directly actuating said valves operatively associated with said lost-motion connection so that its position depends upon the distance between the movably-related parts of said lost-motion connection.

2. In a brake system for motors, the combination, with a suction pipe, and rodding for the brakes, of a brake cylinder capable of being placed in communication with the suction pipe or with the atmosphere, a piston working therein and on which the engine suction acts to effect the braking operation, valves for controlling the communication of the cylinder with said pipe and with the atmosphere, a brake-operating element, a lost-motion connection between said operating element and the brake-rodding embodying two movably related parts, and a movable element for actuating said valve operatively associated with said lost-motion connection so that its position depends upon the distance between the movably-related parts thereof; said movable element closing the valve which controls communication between the brake cylinder and the atmosphere before it opens the valve controlling communication between said cylinder and the suction pipe when such distance exceeds a given minimum extent.

3. In a brake system for motors, the combination, with a suction pipe, and rodding for the brakes, of a brake cylinder capable of being placed in communication with the suction pipe or with the atmosphere, a piston working therein and on which the engine suction acts to effect the braking operation, valves for controlling the communication of the cylinder with said pipe and with the atmosphere, a brake-operating element, a lost-motion connection between said operating element and the brake-rodding embodying two movably-related parts, a movable element for actuating said valves and a flexible connection between the valve-actuating element and the lost-motion connection embodying a wire attached at one end to one of the parts of said lost-motion connection and at the other end to said valve-actuating element, and a sheath encasing said wire and attached at one end to the other part of said lost-motion connection and at the other end to a fixed point on the apparatus.

4. In a brake system for automobiles, a power means responsive to pressure differences, valves for controlling such pressure differences, a manually-operable element, connections between said power means and the brakes, a variable connection between and controlled by the relative positions of the manual element and the brakes, and means controlled by the relative positions of such variable connection for directly actuating said valves to induce at will in the power means such pressure differences as to set or maintain the braking action or nullify the power differences to release the brakes.

5. In a braking mechanism for automobiles, a power means responsive to pressure differences, a connection between the braking mechanism and power means, a distributor including an engine suction controlling valve and an atmospheric controlling valve for creating such pressure differences, an element operatively connected with said valves and serving at relatively opposite limit movements to directly and reversely control the respective valves, a manually-operable element, a variable connection between the manually-operable element and the braking mechanism, and means controlled by the relative positions of such variable connection to actuate the element for the corresponding control of the valves.

6. In a braking system for automobiles, a power means responsive to pressure differences, a connection between the power means and braking mechanism, a distributor for controlling the power differences and including a valve controlling the engine suction to the power means and a valve controlling an atmospheric vent to the power means, an element arranged between and independently movable relative to both valves, means whereby the element in its respectively opposite limit positions will directly open the respective valves, resilient means between such element and valve to cause the element when moving in a direction to open one of the valves, to act through said resilient means to close the other of said valves, a manually-operable element, a two-part connection between said element and the braking mechanism, and means controlled by the relative positions of the two-part connection to operate the element for the control of the valves.

7. In a brake system for motors, a brake cylinder having a piston connected to the braking mechanism, valves for controlling communication of the cylinder with the suction of the engine or with the atmosphere, an operating element, valve operating means, and a lost-motion connection between the operating element and the braking mechanism serving in the relative positions of the parts of such connection to actuate said valve operating means.

8. In a brake system for motors, braking mechanism, a cylinder having a piston connected to the braking mechanism, valves arranged in alignment and operating to control communication of the cylinder with the suction pipe of the engine or with the atmosphere, an operating element, a lost motion two part connection between the operating element and the braking mechanism, and means governed by the relative positions of the parts of such lost motion connection to control said valves, said means operating through direct contact to directly open the valves, and a resilient medium arranged between the alined valves and tensionally varied by the position of said means to close the valves in a predetermined operation of said means.

9. In a brake system for motors, braking mechanism, a cylinder having a piston connected to the braking mechanism, valves controlling the admission of the engine suction and the atmosphere to the cylinder for controlling the movement of the piston, a manually operable element, a two-part lost motion connection between the manual element and the braking mechanism, said parts being relatively movable through the movement of the manual element or through the movement of the braking mechanism, and means governed by the relative position of said parts of the lost motion connection to control the operation of the valves, said means being responsive through the resultant movement of the parts of the lost motion connection incident to a movement of the braking mechanism through leakage into the cylinder to open the valve controlling the engine suction to the cylinder to an extent and for a period to counteract such leakage.

10. In a brake system for motors, braking mechanism, a cylinder having a piston connected to the braking mechanism, valves controlling the admission of the engine suction and the atmosphere to the cylinder for controlling the movement of the piston, a manually operable element, a two-part lost motion connection between the manual element and the braking mechanism, said parts being relatively movable through the movement of the manual element or through the movement of the braking mechanism, and means governed by the relative position of said parts of the lost motion connection to control the operation of the valves, said means being responsive through the resultant movement of the parts of the lost motion connection incident to a movement of the braking mechanism through leakage into the cylinder to open the valve controlling the engine suction to the cylinder to an extent and for a period to counteract such leakage, said lost-motion parts thereafter acting through restoration of the brake action to close such suction valve.

In testimony whereof I affix my signature.

ALBERT DEWANDRE.